June 10, 1958  P. G. LOVELL ET AL  2,838,729
VOLTAGE REGULATING DEVICE
Filed Nov. 23, 1953  3 Sheets-Sheet 1
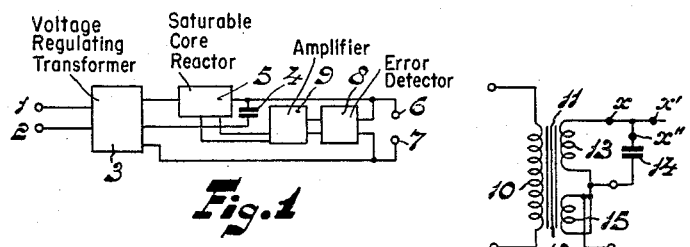
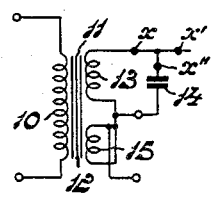
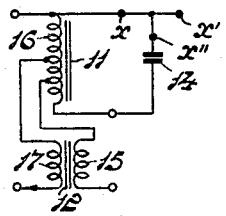
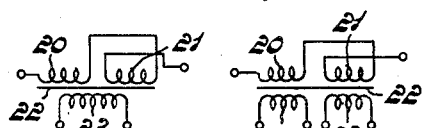
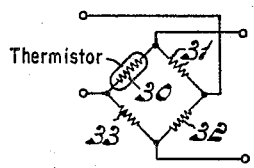
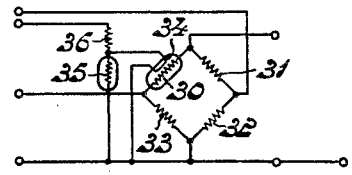
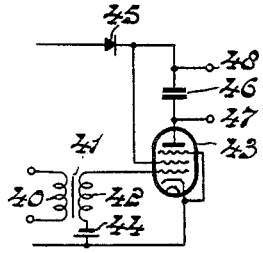
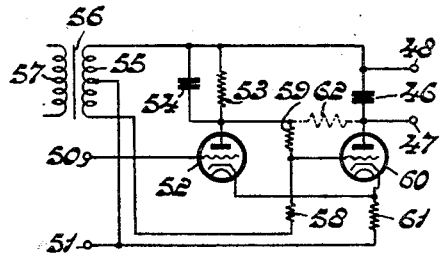
INVENTOR
PETER GARETH LOVELL
ROBERT BRYCE STEPHENS
BY
AGENT June 10, 1958  P. G. LOVELL ET AL  2,838,729
VOLTAGE REGULATING DEVICE
Filed Nov. 23, 1953  3 Sheets-Sheet 2

INVENTORS
PETER GARETH LOVELL
ROBERT BRYCE STEPHENS
BY Fred M. Vogel
AGENT

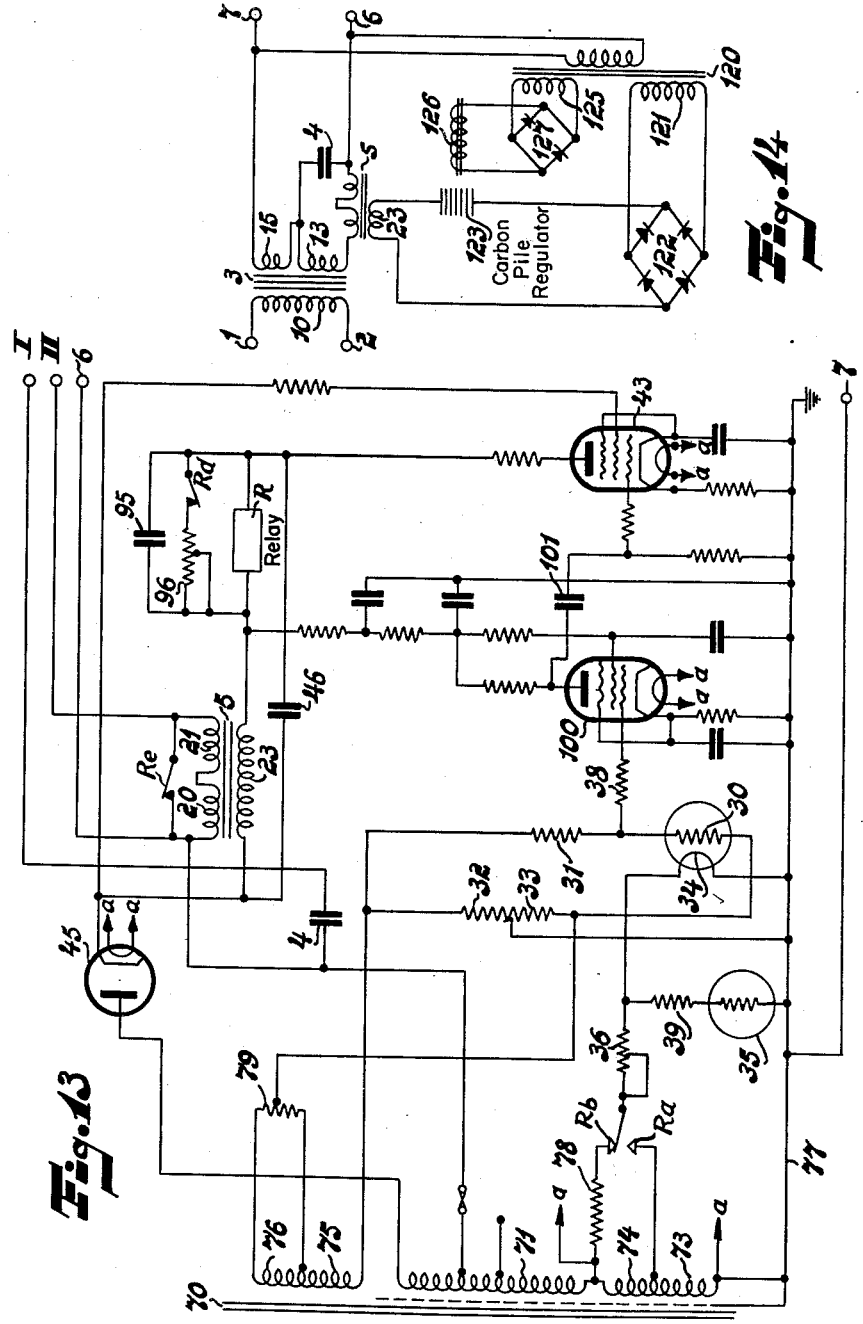

United States Patent Office 2,838,729
Patented June 10, 1958

2,838,729

VOLTAGE REGULATING DEVICE

Peter Gareth Lovell, London, and Robert Bryce Stephens, Watford, England, assignors, by mesne assignments, to North American Philips Company, Inc., New York, N. Y., a corporation of Delaware Application November 23, 1953, Serial No. 393,876

9 Claims. (Cl. 323—66)

The present invention relates to voltage regulating circuits. More particularly, the invention relates to voltage regulating circuits for connecting to an alternating current supply the voltage and frequency of which are liable to vary and for maintaining a substantially constant alternating potential across a pair of output terminals, with variation of the voltage or the frequency of the supply or variations of load across the output terminals of the circuit.

For regulating the voltage across a pair of output terminals it is known to use transformers of the type comprising a primary winding or windings for connection to an alternating current supply, a core part which is saturable and a core part which is unsaturated under operating conditions, the saturable core part carrying a winding across which is connected a condenser. Several forms of regulating transformers of this type are known which are very effective in maintaining a constant output voltage when varying input voltage or output load. This correction moreover, is brought about very quickly, that is to say, in an interval of a few cycles at the supply frequency. Such transformers, however, will not in general maintain the output voltage constant with variation in the supply frequency or, in the case of a transformer specially designed to give a measure of correction with variable supply frequency, will not do so for variation in the output load.

An object of the present invention is to provide a circuit for connection to an alternating current supply of variable voltage and frequency, which circuit will maintain a substantially constant alternating voltage across a pair of output terminals notwithstanding variation of the supply voltage and frequency and variations of the output load.

According to the present invention, a voltage regulating circuit comprises a regulating transformer of the type set forth, a variable reactance connected between an output terminal of the transformer and an output terminal of the circuit or in the circuit comprising the winding carried by the saturable core part and the associated condenser or both, an output voltage error detector connected across the output terminals of the circuit and means associated with the detector and adapted to control the value of the variable reactance so as to oppose any variation from the nominal value of the voltage between the output terminals of the circuit.

Preferably, the means associated with the error detector for controlling the variable reactance are constituted by an amplifier, and the variable reactance is conveniently a saturable core reactor having a control winding for carrying a D. C. current controlled by the amplifier.

Preferably also the error detector is responsive to R. M. S. values whereby to provide indications substantially independent from waveform changes.

For a better understanding of the present invention, reference may be had to the following description taken in connection with the accompanying drawings, in which:

Fig. 1 shows, primarily in block diagram, the voltage regulating circuit in accordance with the invention;

Figs. 2 and 3 each illustrate a voltage regulating transformer which may be used in the circuit shown in Fig. 1;

Figs. 4 and 5 each illustrate a saturable core reactor which may be used in the circuit shown in Fig. 1;

Figs. 6 and 7 each illustrate an output voltage error detector which may be used in the circuit shown in Fig. 1;

Figs. 8 and 9 each illustrate an amplifier which may be used in the circuit shown in Fig. 1;

Fig. 13 illustrates a portion of the voltage regulating circuit shown in Fig. 12 in modified form; and Fig. 14 illustrates a circuit in accordance with the teachings of the invention which avoids the use of thermionic tubes.

Figure 10:
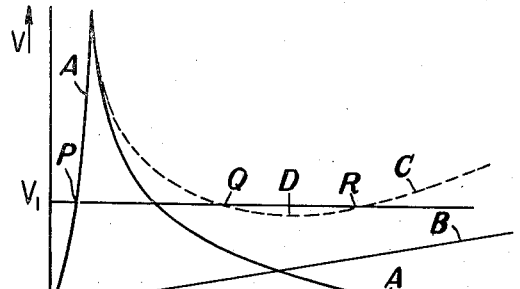
Figs. 10 and 11 show characteristic curves for explaining the operation of the output voltage error detectors illustrated in Figs. 6 and 7.

Referring now to the diagram shown in Fig. 1 of the accompanying drawing, input terminals 1 and 2 are connected to an alternating current supply and to the input winding of a voltage regulating transformer 3 of the type described. The transformer 3 has a winding which is designed to be shunted by a condenser. In the form of the apparatus shown in Figure 1, this condenser is shown at 4 and is connected across its associated winding by way of the main winding of a saturable core reactor 5, this winding being connected also in series with the output of the transformer 3 which is connected to the output terminals 6 and 7 of the circuit. An output voltage error detector 8 is connected between the output terminals 6 and 7 and supplies a signal which varies according to the potential appearing between the terminals 6 and 7, to an amplifier 9. The output of this amplifier provides a control current through the control winding of the reactor 5 and controls the reactance of the reactor 5 in the sense to oppose any variation of the output voltage from its nominal value.

The units shown in block form in Figure 1 may all take a number of different forms and will give the required results for the circuit as a whole, provided that the characteristics of the units are made suitable one to another.

By way of example, voltage regulating transformers which may be used in the circuit shown in Fig. 1 are illustrated in detail in Figs. 2 and 3.

The transformer shown in Figure 2 has a primary winding 10 which is connected to an A. C. supply. The core of the transformer has two parts 11 and 12, the part 11 being so dimensioned that it becomes saturated within the working range of the transformer and the part 12 being arranged so that it does not saturate under working conditions. The saturated core part 11 has a winding 13 wound on it which is shunted by a condenser 14. The unsaturated core part 12 has a winding 15.

The transformer shown in Figure 3 has a winding 16 wound on a saturated core part 11. Part of the winding 16 is connected in series with another winding 17 wound on the unsaturated core part to comprise, together, the primary of the transformer. The whole of the winding 16 is shunted by a condenser 14. Part of the winding 16 is connected in series with a winding 15 on the unsaturated core part 12 to form, together, the secondary of the transformer.

These two transformers are similar in principle in that the primary winding produces flux in both the saturated and unsaturated core parts. The winding on the saturated part produces a voltage which does not rise proportionately with rise in the input voltage. The winding on the unsaturated core part is connected in opposition to the first winding and produces a smaller voltage which increases with the input voltage and, since it is opposed to the main output voltage, keeps the resultant output voltage substantially constant over a wide range of input voltage variation. In each case, the saturated core part carries a winding which is shunted by a condenser. This condenser has a large value and produces with the winding a condition near to resonance, thereby increasing the circulating current in the series circuit comprising the winding and the condenser.

The points marked X, X' and X" in Figures 2 and 3 show, by way of example, alternative positions where the saturable core reactor 5 may be inserted. The point X" shows a position in series with the condenser, the point X' shows a position in series with the transformer output and the point X shows the preferred position of the saturable core reactor which is in series both with the output and the condenser.

As a further alternative, the reactor can be arranged in parallel with capacitor 14.

Since the output of a transformer according to Figure 2 or Figure 3 is approximately constant with changing input voltage and load, the insertion of a reactance 5 at the point X' must make the output voltage across the terminals 6, 7 dependent on the load current flowing through the reactance, in the absence of the units 8 and 9. Any such voltage change due to load variation is corrected by the operation of the units 8 and 9, but the possible variation for which the units 8 and 9 have to correct is thereby increased; the reactance 5 must be designed to operate over a wider range of inductance values and the combination of the detector 8 and the amplifier 9 must have a higher sensitivity and quicker response.

It has been found that when the reactor 5 is connected at either point X or X", the output of a transformer according to Figure 2 or Figure 3 still remains constant with changing input voltage and load for a given value of the reactance 5.

Changes of input voltage and load may occur rapidly and are corrected rapidly by the normal action of the voltage regulating transformer as has been stated in an interval of time of a few cycles at the supply frequency. Change of frequency of a supply normally occurs more slowly and if the units 8, 9 are required to correct for voltage changes at the outputs 6, 7 due solely to the change of supply frequency, the combination of the detector 8 and the amplifier 9 can have a lower sensitivity and a lower response, with consequent saving in cost of these units.

The saturable core reactor 5, shown in Fig. 1, may consist of a main winding and a control winding wound on the same core, but it is preferred to wind the main winding in two parts. Two examples of the preferred type of saturable core reactor are illustrated in Figs. 4 and 5. Figure 4 shows such an arrangement in which the core 22 carries a control winding 23, the main winding being in two parts 20 and 21. These two parts 20 and 21 are connected so that any alternating component in the current carried by the winding 23 induces an equal and opposite voltage in the two winding parts and is thus cancelled out in the winding as a whole.

The arrangement shown in Figure 5 has the main winding in two parts 20 and 21 arranged as already described with reference to Figure 4. The core 22 carries the control winding 23 and an additional winding 24. In this arrangement, control of the reactance is effected by passing a steady current through the winding 24 and by passing the control current through the winding 23 in the sense to oppose the effect of the current in the winding 24. A change of the control current in a given sense thus produces a change of reactance in opposite senses in the two forms of reactor shown in Figures 4 and 5.

The detector shown as block 8 in Figure 1 may consist in its simplest form of a potentiometer comprising a resistance and thermistor connected across the output terminals 6 and 7 or across a step-down transformer connected across the output terminals, the signal corresponding to the voltage error being obtained across either the thermistor or the resistance. However, it is preferred to use a Wheatstone bridge circuit, as illustrated by way of two examples in Figs. 6 and 7, so that the error signal is zero when the bridge is balanced, that is to say, when the potential between the terminals 6 and 7 is at its nominal value.

Figure 6 shows such a bridge circuit in which one arm of the bridge contains a thermistor 30 and the other three arms contain resistances 31, 32 and 33. The input to the bridge is connected across the output terminals 6, 7 by way of a step-down transformer and the proportion of the output voltage applied to the bridge and the values of the resistance arms are so chosen that the bridge is balanced when the output voltage is at its nominal value. A rapidly increasing error signal is obtained as the output voltage across the terminals 6 and 7 departs from the nominal value and the phase of the signal as the voltage rises above the nominal value is opposite to that occurring when the voltage falls below the said value.

There is a serious disadvantage inherent in the simple bridge shown in Figure 6, in that there may be three current values corresponding to a given voltage drop across the thermistor and resistance combination and a consequent ambiguity in the operation of the bridge, unless precautions are taken to ensure that the bridge is rendered inoperative except in the required condition.

This characteristic will be understood more clearly from Figure 10 of the accompanying drawings in which the curve A represents a typical voltage/current characteristic of a thermistor, B the voltage/current characteristic of an ohmic resistance and C the resultant obtained by adding together the ordinates of curves A and B. The characteristic curve of a thermistor, as shown by the curve A, rises rapidly from the origin to a maximum value beyond which, for increasing current values, the voltage across the thermistor falls rapidly at first and then more gradually. The characteristic of an ohmic resistance, is of course, a straight line through the origin and the resultant of the thermistor and the resistance is a curve which rises sharply to a maximum, falls to a minimum and then rises again. On the curve C, this minimum is indicated at D. For voltage values above this minimum, as for example shown at $V_1$ in Figure 10, there are three possible current values of the curve C as shown at points P, Q and R. The point R is the one which is normally required for balancing the bridge and elaborate precautions must be taken to render the regulating device inoperative if the input voltage to the bridge varies sufficiently from its nominal value to shift the working point of the thermistor from the region of this point R. Such means are known and may comprise relay-operated switches to render the bridge inoperative or to supply a voltage of the required magnitude from another source in the event of the input voltage to the bridge varying beyond the permissible limits.

In a circuit according to the present invention, it is preferred to avoid this ambiguity in the operation of the output voltage error detector by using a bridge circuit as shown in Figure 7.

In this arrangement, on arm of a Wheatstone bridge is an indirectly heated thermistor having a resistance element 30 and a heater 34. The other three arms of the bridge are made up of resistances 31, 32 and 33 as in the arrangement of Figure 6.

Figure 11:
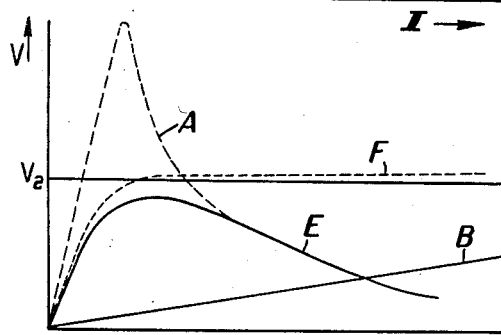

The operation of this bridge arrangement is best understood from Figure 11 of the accompanying drawings in which the curve A corresponds to the curve A in Figure 10 and is the characteristic curve of an indirectly heated thermistor with zero heater current. The curve B similarly corresponds to the curve B of Figure 10 and represents an ohmic resistance. The curve E represents one of a family of characteristic curves for the indirectly heated thermistor when a current flows through the heater. It will be seen that the voltage value of the initial maximum decreases as the heater current increases. The curve F represents the resultant obtained by adding together the ordinates of the curves B and E. It will be seen that the minimum D of the curve C in Figure 10 is now avoided and above the value $V_2$, the new value of the initial maximum of the curve E plus the value of the curve B at the same current value, the curve F rises continuously in an almost linear manner. Consequently, with the bridge arrangement shown in Figure 7 there is no ambiguity in working and the precautions necessary with the simple bridge circuit of Figure 6 are not required.

As is known, the resistance of a thermistor varies with ambient temperature and consequently the balance point of the bridge described so far with reference to Figure 7 would vary with ambient temperature. To compensate for this effect, the current for the heater 34 is obtained from a potentiometer consisting of a resistance 36 and a thermistor 35 connected across a voltage source. The current for the heater 34 is derived from the voltage appearing across the thermistor 35. As the ambient temperature increases, the resistance of the thermistor 35 decreases and the voltage appearing across the thermistor also decreases. In consequence, the current flowing through the heater 34 decreases and the temperature of the thermistor 30 is reduced thus counteracting the rise in ambient temperature.

If the voltage appearing across the terminals 6 and 7 of the circuit shown in Figure 1 varies from the nominal value for which the bridge is balanced, a signal, which is in phase or in anti-phase with the supply according to whether the output voltage is above or below the nominal value, will appear across the output of the bridge. This signal is fed to the amplifier 9 and serves to vary the current flowing in the control winding of the saturable reactor 5 so as to restore the output voltage to its nominal value. Th amplifier therefore needs to be sensitive both to the magnitude and to the phase of the output signal. Suitable amplifier circuits are shown, by way of example, in Figures 8 and 9.

In the amplifier circuit shown in Figure 8, the signal appearing at the output of the thermister bridge is applied across the primary winding 40 of a high ratio step-up transformer 41, the secondary winding of which is connected between the control grid and cathode of a pentode tube 43 in series with a source of grid bias potential 44. The anode and cathode circuits of the pentode 43 are connected to the terminals 6 and 7 so that the high-tension voltage for the pentode 43 is provided by the potential appearing across the terminals 6 and 7 which is supplied to the anode and screen of the pentode 43 through a half-wave rectifier 45. The rectifier 45 is provided to protect the tube from inverse voltages. The anode load, not shown in Figure 8, is provided by the control winding of the saturable reactor 5, the ends of the winding 23 being connected across the terminals 47 and 48 and being shunted by a condenser 46. Since a half-wave rectified potential from the alternating voltage appearing across the terminals 6 and 7 is applied to the anode of the tube 43, it will be understood that this amplifier circuit is sensitive to both the phase and magnitude of the signal applied across the primary winding 40 and a rectified and smoothed current, the magnitude of which is determined by the phase and magnitude of the input signal, flows through the winding 23 of the saturable reactor 5.

In the amplifier circuit of Figure 9, one input terminal 50 is connected to the control grid of a triode 52 in the anode circuit of which is the parallel combination of a load resistance 53 and a by-pass condenser 54. The other end of the combination 53, 54 is connected to one end of the secondary winding 55 of a transformer 56, the primary winding 57 of which is connected across terminals 6 and 7. The winding 55 has a center tap which is connected to the other input terminal 51 and the other end of the secondary winding 55 is connected to one end of a potentiometer comprising resistances 58 and 59. The other end of this potentiometer is connected to the anode of the tube 52 and the tapping point of the potentiometer is connected to the control grid of a second triode 60. The cathode of the tube 60 is connected through a resistance 61 to the input terminal 51. The anode circuit of the tube 60 comprises the winding 23 of the saturable core reactor 5, not shown in Figure 9, which is connected between terminals 47 and 48 and shunted by the condenser 46. The anode circuit of the tube 60 is connected to the same end of the secondary winding 55 as is the anode circuit of the tube 52.

The operation of the amplifier circuit shown in Figure 9 can be best understood if the circuit is regarded as a modification of the well-known Schmitt trigger circuit which, instead of being operated with D. C. potentials on the anodes of the tubes is operated with alternating potentials, so that the known circuit is modified to provide phase-discriminating operation by an alternating voltage applied between the terminals 50 and 51.

The known Schmitt trigger circuit has two modes of operation, one when one tube is conducting and the other when the other tube is conducting. A similar result can obviously be achieved in the A. C. version of the circuit; the operation of either tube being determined by the phase of the input signal. However, for the present purpose the output current is required to be dependent in magnitude on the magnitude of the input signal and, to achieve the operation of the circuit as a high-gain amplifier and not as a trigger circuit, the values of the resistances 58, 59 and 61 must be correctly chosen or a stabilizing resistance, shown in dotted lines at 62, may be connected between the anode of the tube 52 and the anode of the tube 60.

Figure 12:
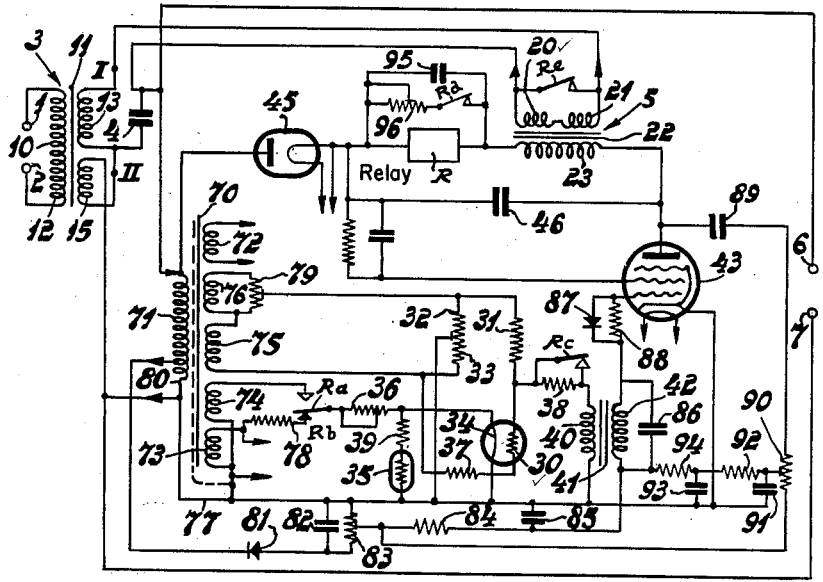
Fig. 12 shows in detail an embodiment of a voltage regulating circuit in accordance with the invention.

A preferred form of the voltage regulating circuit shown primarily in block form in Figure 1 will now be described in detail with reference to Figure 12 of the drawings. In the circuit of Figure 12, the voltage regulating transformer 3 is of the form shown in Figure 2 and the input terminals 1 and 2 of the circuit are connected to the ends of the primary winding 10. The saturable core reactor 5 is of the form shown in Figure 4 and the main windings 20 and 21 are connected in series with the output of the transformer 3 and with the condenser 4 connected across the winding 13. This is the preferred position for the reactor 5 as mentioned hereinbefore. The output voltage of the circuit is derived from the output of the transformer 3 through the series reactor 5 and appears across the output terminals 6 and 7. Connected across the output of the circuit is the primary winding 71 of a transformer 70. This transformer provides the high-tension and heater supplies for the amplifier, the heater supply for an indirectly heated thermistor and the input to a thermistor bridge, as will be described below in greater detail.

The voltage error detector is a thermistor bridge of the form described with reference to Figure 7, there being minor modifications in that one arm of the bridge comprises the thermistor element 30 connected in series with a small resistance 37 and the arms 32 and 33 are constituted by the parts of a pre-set variable potentiometer. The output of the bridge appears between the tap of the pre-set potentiometer 32, 33 and the junction of the thermistor element 30 and the resistance 31.

This signal is applied to the input of an amplifier which is of the form described with reference to Figure 8 and, to this end, the junction between the thermistor element 30 and the resistance 31 is connected to one end of the primary winding 40 of the transformer 41 through a resistance 38 which, however, is shorted out by the relay operated switch Rc under normal operating conditions of the circuit.

The transformer 70 has a low voltage secondary winding 72 which is connected to the heater of a diode rectifier 45. A second low voltage secondary winding 73 is connected to the heater of the pentode 43. One end of the winding 73 is also connected to the common base-line 77 which is connected to the output terminal 7 of the circuit. The other end of the winding 73 is connected through a low resistance 78 to a relay operated switch Rb, which is open under normal operating conditions of the circuit.

A further secondary winding 74 of transformer 70 also has one end connected to the base-line 77 and the other end connected to a relay operated switch Ra, which is closed under normal operating conditions of the circuit, and thence to the pre-set variable resistance 36. In this arrangement, the voltage normally applied to the thermistor heater 34 is that part of the voltage of the winding 74 appearing across the series combination of a resistance 39 and the thermistor 35.

Two further secondary windings 75 and 76 of the transformer 70 are connected in series, one end of the winding 75 being connected to the input of the thermistor bridge at the junction of the resistances 33 and 37. The winding 76 is shunted by a pre-set variable potentiometer 79, the tap of which is connected to the other input point of the thermistor bridge at the junction between the resistances 31 and 32.

The primary winding 71 of transformer 70 has a portion 80 nearest the base-line 77 tapped off therefrom to provide a bias voltage for the tube 43. This voltage is rectified by a rectifier 81 which is connected in series with the primary winding tapping point and one end of the parallel combination of a condenser 82 and a pre-set variable potentiometer 83, the other ends of the combination being connected to the base-line 77. A rectified bias voltage thus appears across the potentiometer 83. The tapping point of the potentiometer 83 is connected through a bypass resistance 84 to the low potential end of the secondary 42 of transformer 41 which is connected to the base-line 77 through a bypass condenser 85.

The secondary winding 42 is shunted by a small condenser 86 and the high potential end of the winding is connected to the control grid of the tube 43 through the parallel combination of a rectifier element 87 and a resistance 88.

The purpose of the condenser 86 is to provide phase correction to bring the bridge output signal exactly in phase or in anti-phase, with the rectified voltage applied to the anode of tube 43.

The object of the rectifier 87 and resistance 88 is to prevent an effective short-circuiting of the bridge by the grid current of the tube 43 in the event that the grid is driven too far positive. The anode of the tube 43 is connected through a condenser 89 to one end of a pre-set potentiometer 90, the other end of which is connected to the tap of the potentiometer 83. The tap of the potentiometer 90 is connected to the low-potential end of the secondary winding 42 by way of a bypass network consisting of a shunt condenser 91, a series resistance 92, a second shunt condenser 93 and a second series resistance 94. A proportion of the output voltage of the tube 43 appears across the potentiometer 90 and a part thereof appearing at the tap is applied to the input of the tube 43 as negative feedback. In the event of a rapidly changing voltage appearing at the anode of the tube 43, this negative feedback prevents any tendency of the device to hunt without decreasing the sensitivity of the amplifier.

The anode of the tube 43 is connected, as previously described to the control winding 23 of the reactor 5 and, in this arrangement, is connected through a relay R to the series diode rectifier 45. The relay R has connected in parallel therewith a condenser 95 and the series combination of a pre-set variable resistance 96 and a relay operated switch Rd which is open under normal operating conditions of the circuit. In addition to Rd, the relay R also actuates switches Ra, Rb, Rc and Re as explained below.

In the event of failure of the anode current of the tube 43, for any reason, and the consequent failure of the control current through the reactor winding 23, the circuit 4, 13 is brought nearer to resonance and consequently the output voltage of the circuit appearing across the terminals 6 and 7 tends to rise to a high value. The relay R is provided in the anode circuit of tube 43 in order to prevent this occurrence. In the event of the anode current ceasing, the relay R becomes de-energized and closes a switch Rc connected across the main windings 20 and 21 of the reactor 5. The effect of a short-circuit on these windings is to shift the circuit 4, 13 away from resonance and thus produce a low voltage at the output terminals of the circuit and the load circuit is thus protected against excessive voltage.

The relay R also facilitates bringing the device into operation since, when the device is first switched on, the tube 43 does not at once pass anode current due to its heater being cold and the relay R therefore carries no energizing current. In the de-energized condition of the relay, not only is the switch Rc closed, as described above, but the switch Rb is closed and the switch Ra is opened thus applying the voltage from the winding 73, which is in excess of that from the winding 74, across the potentiometer 36, 39, 35 and hence across the heater 34 of the indirectly heated thermistor, so that the thermistor element 30 is quickly brought to its correct operating point. In the de-energized condition of the relay R, the switch Rc is opened, thereby connecting the series resistance 38 into circuit so that the whole of the excessive out of balance voltage appearing across the output of the bridge is not fed to the transformer 41. The switch Rd is also closed thus connecting the resistance 96 in parallel with the relay R.

When the anode current of the tube 43 reaches a value sufficient to energize the relay R, the normal heater current is applied to the thermistor heater 34 from the winding 74 by way of the switch Ra. The resistance 38 is short-circuited by the switch Rc to restore the full sensitivity of the bridge and associated amplifier. The switch Rd is opened, thereby open-circuiting the resistance 96.

The value of the anode current at which relay R becomes energized is determined by the value of the pre-set variable resistance 96 and is adjusted by this means to a value of anode current which does not produce a surge in the output voltage of the circuit when the contact Re, connected across the windings 20, 21 of the reactor 5, is opened.

As an alternative to the arrangement described for providing the tube 43 with a rectified and smoothed bias, said tube may be operated with an alternating potential on the grid in antiphase to the potential applied to the anode. It is preferred to provide such A. C. bias in the cathode circuit of the tube and the cathode is accordingly returned to the high potential end of the winding 80 or to the tap of a potentiometer connected across this winding.

As has been explained previously, the reactance of the saturable core reactor 5 increases as the anode current of the tube 43 decreases and the output voltage appearing across the terminals 6 and 7 increases. In the event of a failure of the tube 43 or before anode current commences to flow on switching on, the output voltage tends to rise to an excessive value and to avoid this condition the relay R is included in the circuit of Figure 12 as described. As an alternative, a saturable core reactor as shown in Figure 5 may be used. In this arrangement, a constant direct current is passed through the winding 24 and the rectifier supplying this current is arranged so that this current builds up quickly on switching on the apparatus. In this way, the output voltage occurring across the terminals 6 and 7 is kept to a low value on switching on or in the event of a failure of the tube 43. The phase relationship of the input to the amplifier is reversed so that increasing current flowing through the winding 23 increases the output voltage of the circuit.

In a modified form of the amplifier described with reference to Figure 8 and embodied in the preferred form of the circuit shown in Figure 12, the input transformer 41 may be replaced by a tube operating as a voltage amplifier. The output from the thermistor bridge is then applied to the control grid of such a tube and the output signal therefrom is applied to the control grid of the tube 43.

Such an arrangement is shown in Figure 13 of the drawings, in which like components have the same reference numerals as Figure 12. The additional tube is designated 100, and its anode is coupled to the control grid of tube 43 through a capacitor 101. The anodes of tubes 100 and 43 are coupled through the relay R and this provides a degree of negative feedback for anti-hunting purposes. This operates for A. C. only in view of the presence of capacitor 101, as is the case in the circuit of Figure 12 due to the capacitor 89.

The regulating transformer is not shown in Figure 13, the terminals I and II corresponding to the points I and II of Figure 12.

In another modified form of the circuit according to Figure 1, the output voltage error detector 5 may be a magnetic bridge and the amplifier 9 may be a magnetic amplifier instead of a thermionic tube amplifier, the use of thermionic tubes in the device being thereby avoided.

In still another modification, the amplifier may be dispensed with, a carbon pile regulator being used to control D. C. current passing through the winding 23 of the saturable reactor. Such a circuit is shown in Figure 14 of the drawings.

The circuit shown in Fig. 14 has the advantage of complete absence of thermionic tubes. A supply transformer 120 fed from the output terminals 6, 7 has a secondary winding 121 providing current for the reactor coil 23, which current is rectified by a dry rectifier system 122 and regulated by the carbon pile 123. Another secondary winding 125 provides current for the control winding 126 of the carbon pile regulator through another dry rectifier system 127.

While the invention has been described by means of specific examples and in specific embodiments, we do not wish to be limited thereto, for obvious modifications will occur to those skilled in the art without departing from the spirit and scope of the invention.

What is claimed is:

1. A voltage regulating circuit comprising a regulating transformer including a winding and an associated saturable core, a capacitor connected across said winding, input and output terminals, said transformer being connected to said input terminals, a variable reactance coupled to one of said output terminals and said winding, an output voltage error detector connected across said output terminals, said output voltage error detector comprising means for producing a no error signal when the voltage at said output terminals is at its nominal value and for producing an increasing error signal having a given phase when said voltage rises above said nominal value and having a phase opposite to said given phase when said voltage falls below said nominal value, and means responsive to said error signal to control the value of said variable reactance and thereby to oppose any variation from said nominal value of said voltage.

2. A voltage regulating circuit as set forth in claim 1, wherein said means responsive to said error signal comprises a phase and magnitude sensitive amplifier.

3. A voltage regulating circuit as set forth in claim 2, wherein said variable reactance comprises a second saturable core reactor having a control winding coupled to the output of said amplifier.

4. A voltage regulating circuit as set forth in claim 2, further including a power supply transformer having a primary winding connected to said output terminals and secondary windings connected to said error detector to apply an input signal thereto and to said amplifier to supply energy thereto.

5. A voltage regulating circuit as set forth in claim 4, wherein said amplifier includes a thermionic tube having an anode, and further comprising a relay coupled to the anode circuit of said tube and adapted to short circuit said variable reactance automatically when the anode current of said tube is less than a predetermined value.

6. A voltage regulating circuit as set forth in claim 1, wherein said error detector comprises a device responsive to root-mean-square values of the voltage at said output terminals whereby the value of said variable reactance is substantially independent of the wave-form changes of said voltage said device comprising a bridge circuit including a non-linear impedance and means responsive to said error signal to control the value of said variable reactance and thereby to oppose any variation from said nominal value of said voltage.

7. A voltage regulating circuit as set forth in claim 2, wherein said amplifier comprises a thermionic tube having an anode and a control grid, an alternating current voltage at mains frequency being applied to said anode and the output signal from said error detector being applied to said control grid.

8. A voltage regulating circuit as set forth in claim 6, wherein said non-linear impedance constitutes a first thermistor.

9. A voltage regulating circuit as set forth in claim 8, further comprising circuit means for counteracting the effect of ambient temperature changes on said thermistor, said circuit means including means for indirectly heating said first thermistor and means including a second thermistor responsive to said ambient temperature changes for controlling the amount of energy supplied to said means for indirectly heating said first thermistor.

References Cited in the file of this patent

UNITED STATES PATENTS

| | | |
|---|---|---|
| 2,195,120 | Moyer | Mar. 26, 1940 |
| 2,207,234 | Bohm | July 9, 1940 |
| 2,212,198 | Sola | Aug. 20, 1940 |
| 2,435,572 | Bixby | Feb. 10, 1948 |
| 2,512,317 | Edwards et al. | June 20, 1950 |
| 2,580,020 | Hammond | Dec. 25, 1951 |

FOREIGN PATENTS

| | | |
|---|---|---|
| 160,070 | Germany | Apr. 19, 1905 |